(12) United States Patent
Luttrell

(10) Patent No.: US 8,006,075 B2
(45) Date of Patent: Aug. 23, 2011

(54) DYNAMICALLY ALLOCATED STORE QUEUE FOR A MULTITHREADED PROCESSOR

(75) Inventor: Mark A. Luttrell, Cedar Park, TX (US)

(73) Assignee: Oracle America, Inc., Redwood City, CA (US)

( * ) Notice: Subject to any disclaimer, the term of this patent is extended or adjusted under 35 U.S.C. 154(b) by 272 days.

(21) Appl. No.: 12/469,955

(22) Filed: May 21, 2009

(65) Prior Publication Data

US 2010/0299508 A1 Nov. 25, 2010

(51) Int. Cl.
- G06F 7/38 (2006.01)
- G06F 9/00 (2006.01)
- G06F 9/44 (2006.01)
- G06F 15/00 (2006.01)

(52) U.S. Cl. ........................................ 712/225; 712/216
(58) Field of Classification Search .................. None
See application file for complete search history.

(56) References Cited

U.S. PATENT DOCUMENTS

| | | |
|---|---|---|
| 2,926,317 A | 2/1960 | Blitz |
| 3,093,805 A | 6/1963 | Osifchin et al. |
| 3,659,916 A | 5/1972 | Marcatill |
| 4,382,236 A | 5/1983 | Suzuki |
| 4,666,226 A | 5/1987 | Legrand et al. |
| 4,707,671 A | 11/1987 | Suzuki et al. |
| 4,812,275 A | 3/1989 | Yumoto |
| 4,818,239 A | 4/1989 | Erk |
| 4,878,856 A | 11/1989 | Maxwell |
| 4,891,616 A | 1/1990 | Renken et al. |
| 4,908,259 A | 3/1990 | Yumoto |
| 5,015,519 A | 5/1991 | Yumoto |
| 5,069,626 A | 12/1991 | Patterson et al. |
| 5,080,609 A | 1/1992 | Fabian et al. |
| 5,085,590 A | 2/1992 | Galloway |
| 5,098,769 A | 3/1992 | Nakai et al. |

(Continued)

FOREIGN PATENT DOCUMENTS

DE 43 26 989 3/1994

(Continued)

OTHER PUBLICATIONS

Emer et al.; Late-Binding: Enabling Unordered Load-Store Queues; 2007; ISCA '07.*

(Continued)

Primary Examiner — Eddie Chan
Assistant Examiner — Corey Faherty
(74) Attorney, Agent, or Firm — Rory D. Rankin; Meyertons, Hood, Kivlin, Kowert & Goetzel, P.C.

(57) ABSTRACT

Systems and methods for storage of writes to memory corresponding to multiple threads. A processor comprises a store queue, wherein the queue dynamically allocates a current entry for a committed store instruction in which entries of the array may be allocated out of program order. For a given thread, the store queue conveys store data to a memory in program order. The queue is further configured to identify an entry of the plurality of entries that corresponds to an oldest committed store instruction for a given thread and determine a next entry of the array that corresponds to a next committed store instruction in program order following the oldest committed store instruction of the given thread, wherein said next entry includes data identifying the entry. The queue marks an entry as unfilled upon successful conveying of store data to the memory.

20 Claims, 6 Drawing Sheets

U.S. PATENT DOCUMENTS

| | | | |
|---|---|---|---|
| 5,108,295 A | 4/1992 | Koike et al. | |
| 5,114,364 A | 5/1992 | Hunter | |
| 5,133,669 A | 7/1992 | Barnhouse et al. | |
| 5,149,915 A | 9/1992 | Brunker et al. | |
| 5,160,275 A | 11/1992 | Nakamura et al. | |
| 5,192,228 A | 3/1993 | Collins et al. | |
| 5,235,132 A | 8/1993 | Ainsworth et al. | |
| 5,267,876 A | 12/1993 | Rupert et al. | |
| 5,468,918 A | 11/1995 | Kanno et al. | |
| 5,575,688 A | 11/1996 | Crane | |
| 5,626,483 A | 5/1997 | Naitoh | |
| 5,727,956 A | 3/1998 | Mitra et al. | |
| 5,909,012 A | 6/1999 | Todd et al. | |
| 5,986,607 A | 11/1999 | Rudisill | |
| 5,995,380 A | 11/1999 | Eakins et al. | |
| 6,074,248 A | 6/2000 | Huang | |
| 6,185,354 B1 | 2/2001 | Kronz et al. | |
| 6,200,146 B1 | 3/2001 | Sarkissian | |
| 6,296,518 B1 | 10/2001 | Avery et al. | |
| 6,302,731 B1 | 10/2001 | Kring | |
| 6,464,510 B1 | 10/2002 | Len | |
| 6,491,545 B1 | 12/2002 | Speigel et al. | |
| 6,721,874 B1 * | 4/2004 | Le et al. | 712/218 |
| 6,765,804 B2 | 7/2004 | Hudson et al. | |
| 6,840,810 B2 | 1/2005 | Brunker et al. | |
| 6,899,546 B2 | 5/2005 | Longueville et al. | |
| 6,976,881 B2 | 12/2005 | Brunker et al. | |
| 6,988,186 B2 * | 1/2006 | Eickemeyer et al. | 712/217 |
| 7,061,342 B2 | 6/2006 | Brunker et al. | |
| 7,101,188 B1 | 9/2006 | Summers et al. | |
| 7,273,401 B2 | 9/2007 | Zaderej et al. | |
| 2003/0010529 A1 | 1/2003 | Sievenpiper et al. | |
| 2005/0026469 A1 | 2/2005 | Ice et al. | |
| 2008/0102692 A1 | 5/2008 | Zaderej et al. | |
| 2009/0013135 A1 * | 1/2009 | Burger et al. | 711/154 |
| 2010/0293347 A1 * | 11/2010 | Luttrell | 711/156 |

FOREIGN PATENT DOCUMENTS

| | | |
|---|---|---|
| DE | 44 16 986 | 5/1995 |
| DE | 195 03 666 | 9/1995 |
| EP | 0 343 771 | 11/1989 |
| EP | 0 598 336 | 5/1994 |
| EP | 0 693 795 | 1/1996 |
| EP | 0 901 201 | 3/1999 |
| GB | 655803 | 8/1951 |
| JP | 1106602 | 4/1989 |
| JP | 62264081 | 4/1989 |
| JP | 10276203 | 9/1998 |

OTHER PUBLICATIONS

International Search Report for PCT/US2004/007841, Nov. 22, 2004.

* cited by examiner

DYNAMICALLY ALLOCATED STORE QUEUE FOR A MULTITHREADED PROCESSOR

BACKGROUND OF THE INVENTION

1. Field of the Invention

This invention relates to computing systems, and more particularly, to efficient storage of pending writes to memory corresponding to multiple threads.

2. Description of the Relevant Art

Modern microprocessors typically buffer retired store instructions that have yet to write data to a memory subsystem. A store queue (SQ) is a hardware structure configured to buffer retired store instructions, or write operations. A particular store instruction is generally held in this structure from the point-in-time the store instruction is retired to the point-in-time it is known that the store instruction has been processed by the memory subsystem such that the corresponding data of the store instruction is globally visible to all processors and threads within the system.

A large SQ may allow for a sufficient number of store instructions to be buffered in the event a store instruction misses in a local cache. When a cache miss occurs, many clock cycles, potentially hundreds of clock cycles considering dynamic random-access memory (DRAM) access latencies, may transpire before the missed store instruction is serviced by a cache fill transaction. If the SQ becomes full, then execution of the corresponding processor may halt. Therefore, it is desirable that a sufficient number of store instructions are buffered in order to handle the case of at least one cache miss.

Generally, modern microprocessors implement out-of-order instruction issue, out-of-order instruction execution, and in-order commit or retirement. Therefore, due to in-order retirement, the data of the store instructions buffered in the SQ may need to be conveyed in-order to a memory subsystem. Since the store instructions of a particular thread are allocated in-order in the SQ, the data of the store instructions are conveyed from the SQ to the memory subsystem in the order they are received, or in program order. Therefore, the SQ logically acts as a first-in-first-out (FIFO) buffer on a thread basis.

A read-after-write (RAW) hazard may occur when a load instruction, or a read operation, attempts to read a memory location that has been modified by an older (in program order) store instruction, which has retired. This older retired store instruction is resident in the SQ, but it has not yet committed its results to the memory location. Therefore, in order to prevent the load instruction from reading a stale value of the memory location contents, some action needs to be taken. For example, the load instruction may need to be stalled until the store instruction commits. Alternatively, the load instruction may have the modified memory location contents bypassed, or forwarded, from the SQ. Regardless of the chosen technique, a search within the SQ may need to be performed in order to detect this RAW hazard.

A search for the above RAW hazard, which may be implemented by circuitry for a content-addressable-memory (CAM) comparison of address and valid status information of all entries within the SQ, may occur before the load instruction may issue for execution. Circuitry for CAM match comparisons typically utilize dynamic logic that consume a relatively high amount of power. An access time of an array utilizing CAM comparison circuitry may be a factor in determining a processor's clock cycle duration. For example, as the number of entries increase in the array, the read, write, and CAM word line drivers need to charge and discharge a greater amount of electrical charge due to the gate and diffusion capacitances of each additional memory cell connected to these lines. In addition, each read, write, and CAM wire capacitance of these lines being charged increases from the increased wire length and cross capacitance. Further still, each memory cell may include additional power and ground lines for shielding of these read, write, and CAM lines, which further increases the size of each additional array entry. Each additional array entry affects on-die real estate, power consumption, and timing, wherein the effect of the latter two does not have a linear relationship. Therefore, the size of the SQ has an upper limit.

In addition, a processor may be multi-threaded, which may further place constraints on the SQ. For a multi-threaded processor, a single-threaded SQ may not be replicated by the number of threads in the multi-threaded processor due to on-chip real estate constraints. A store queue may have 64 entries, in one example, and these 64 entries may provide a desirable trade-off between performance and cost when the SQ is running in single-thread mode. Decreasing the number of entries may have a significant negative impact on performance. However, in a processor core that supports 8 threads, the SQ would need 64×8, or 512, entries, which may be far too large. Such a very large SQ consumes too much on-chip real estate and access times and CAM comparisons would drastically increase the clock cycle time of the processor.

Also, a multi-threaded processor may not comprise a SQ that is divided into sections, wherein each section corresponds to a particular thread. This is an inefficient use of SQ entries. For example, one thread may not be utilizing the SQ as frequently as a second thread. Alternatively, the one thread may not be executing at all, but the second thread is unable to efficiently utilize the available SQ entries since these entries are not assigned to the second thread. Therefore, a multi-threaded processor may utilize a SQ with dynamic allocation of its entries. In addition, with dynamic allocation, the SQ entries may be used in both single-threaded and multi-threaded modes of operation.

However, a caveat with dynamic allocation is there does not exist a relationship, implied or otherwise, between a SQ entry and the order of a corresponding store instruction with respect to other store and load instructions in the pipeline. Accordingly, the determination of load-store RAW hazards becomes more complex as logic needs to ascertain the SQ entries that are older (in program order) than a particular load instruction given that an index of the store instructions buffered in the SQ does not provide age ordering information. Also, recall that the data of the retired store instructions are to be conveyed in-order to a memory subsystem. However, with dynamic allocation, there is no indication which entry holds a corresponding next store instruction in program order from the current entry updating the memory subsystem.

In view of the above, efficient methods and mechanisms for storage of pending writes to memory corresponding to multiple threads are desired.

SUMMARY OF THE INVENTION

Systems and methods for storage of pending writes to memory corresponding to multiple threads are contemplated. In one embodiment, a processor comprises a store queue that includes an array corresponding to multiple threads. The array has a plurality of entries, wherein each entry stores, for a committed store instruction, at least corresponding store data. The array dynamically allocates a current entry of the plurality of entries for a committed store instruction, wherein the current entry is any unfilled entry of the plurality of entries. The array is configured to convey, in program order of committed store instructions of a chosen thread, at least store data of each entry of the plurality of entries corresponding to the chosen thread to a memory coupled to the store queue. The array marks an entry as unfilled upon successful conveying of store data to the memory.

In addition, the store queue has combinatorial logic configured to identify an entry of the plurality of entries that corresponds to the oldest committed store instruction of a chosen thread stored in the array. Also, the logic determines a next entry following a current entry, in program order of committed store instructions of the chosen thread, of the plurality of entries corresponding to the chosen thread, in parallel with said conveying at least store data of the current entry to the memory.

These and other embodiments will become apparent upon reference to the following description and accompanying drawings.

Figure 1:
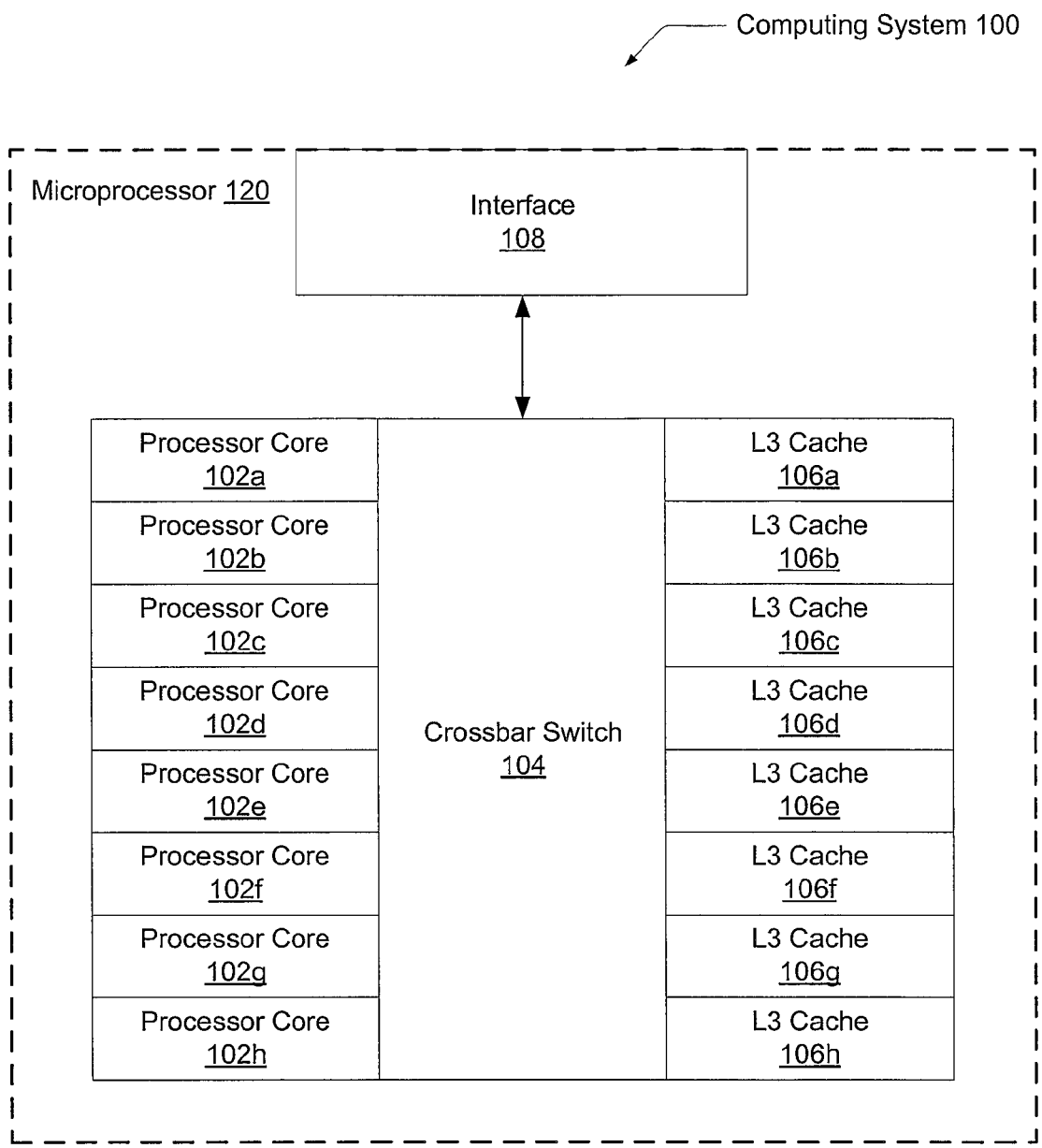
FIG. 1 is a generalized block diagram illustrating one embodiment of a computing system with a multi-threaded microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a computing system 100 with a microprocessor 120 comprising multiple instantiated cores 102a-102h is shown. In one embodiment, microprocessor 120 may be a standalone processor within a mobile laptop system, a desktop, an entry-level server system, a mid-range workstation, or other. For such an embodiment, microprocessor 120 may internally utilize a system bus controller for communication, which may be integrated in crossbar switch 104 or it may be a separate design. A system bus controller may couple microprocessor 120 to outside memory, input/output (I/O) devices such as computer peripherals, a graphics processing unit (GPU), or other. In such an embodiment, logic within such a system bus controller may replace or incorporate the functionality of a memory controller and interface logic 108.

In another embodiment, microprocessor 120 may be included in multiple processing nodes of a multi-socket system, wherein each node utilizes a packet-based link for inter-node communication. In addition to coupling processor cores 102a-102h to L3 caches 106a-106h, crossbar switch 104 may incorporate packet processing logic. Generally speaking, such logic may be configured to respond to control packets received on outside links to which microprocessor 120 may be coupled, to generate control packets in response to processor cores 102a-102h and/or cache memory subsystems, to generate probe commands and response packets in response to transactions selected by interface logic 108 for service, and to route packets for which microprocessor 120 may be included in a node that is an intermediate node to other nodes through interface logic 108. Interface logic 108 may include logic to receive packets and synchronize the packets to an internal clock used by packet processing logic.

As used herein, elements referred to by a reference numeral followed by a letter may be collectively referred to by the numeral alone. For example, processor cores 102a-102h may be collectively referred to as processor cores, or cores, 102. In one embodiment, microprocessor 120 has eight instantiations of a processor core 102. Each processor core 102 may utilize conventional processor design techniques such as complex branch prediction schemes, out-of-order execution, and register renaming techniques.

Each core 102 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 102 may access a cache memory subsystem for data and instructions. Each core 102 may contain its own level 1 (L1) and level 2 (L2) caches in order to reduce memory latency. These cache memories may be integrated within respective processor cores 102. Alternatively, these cache memories may be coupled to processor cores 102 in a backside cache configuration or an inline configuration, as desired.

The L1 cache may be located nearer a processor core 102 both physically and within the cache memory hierarchy. Crossbar switch 104 may provide communication between the cores 102 and L3 caches 106. In one embodiment, crossbar switch 104 may include logic, such as multiplexers or a switch fabric, that allows any L2 cache to access any bank of L3 cache 106, and that conversely allows data to be returned from any L3 bank to any L2 cache. Additionally, in one embodiment, crossbar switch 104 may be configured to arbitrate conflicts that may occur when multiple L2 caches attempt to access a single bank of L3 cache 106, or vice versa.

In addition, cores 102 may be coupled to double data rate dual in-line memory modules (DDR DIMM) that reside on a circuit board outside microprocessor 120. In one embodiment, DDR DIMM channel(s) may be on-chip in order to couple the cores 102 to the DDR DIMM off-chip. Each L3 cache 106 may be coupled to a memory controller or a dynamic random access memory (DRAM) channel for communication to DRAM that resides off-chip. Also, an interface to a system bus may be coupled to the each L3 cache 106.

In one embodiment, each processor core 102 may support execution of multiple threads. Multiple instantiations of a same processor core 102 that is able to concurrently execute multiple threads may provide high throughput execution of server applications while maintaining power and area savings. A given thread may include a set of instructions that may execute independently of instructions from another thread. For example, an individual software process either within a software application, may consist of one or more threads that may be scheduled for execution by an operating system. Such a core 102 may also be referred to as a multithreaded (MT) core. In one embodiment, each of the cores 102 may be configured to concurrently execute instructions from a variable number of threads, such as up to eight concurrently executing threads. In an 8-core implementation, microprocessor 120 could thus concurrently execute up to 64 threads.

In one embodiment, each of cores 102 may be configured for multithreaded, out-of-order execution. More specifically, in one embodiment, each of cores 102 may be configured to perform dynamic multithreading. Generally speaking, under dynamic multithreading, the execution resources of cores 102 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound—completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, cores 102 may be configured to implement fine-grained multithreading, in which each core may select instructions to execute from among a pool of instructions corresponding to multiple threads, such that instructions from different threads may be scheduled to execute adjacently. For example, in a pipelined embodiment of core 102 employing fine-grained multithreading, instructions from different threads may occupy adjacent pipeline stages, such that instructions from several threads may be in various stages of execution during a given core processing cycle. Through the use of fine-grained multithreading, cores 102 may be configured to efficiently process workloads that depend more on concurrent thread processing than individual thread performance.

In one embodiment, cores 102 may also be configured to implement out-of-order processing, speculative execution, register renaming and/or other features that improve the performance of processor-dependent workloads. Moreover, cores 102 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 102 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
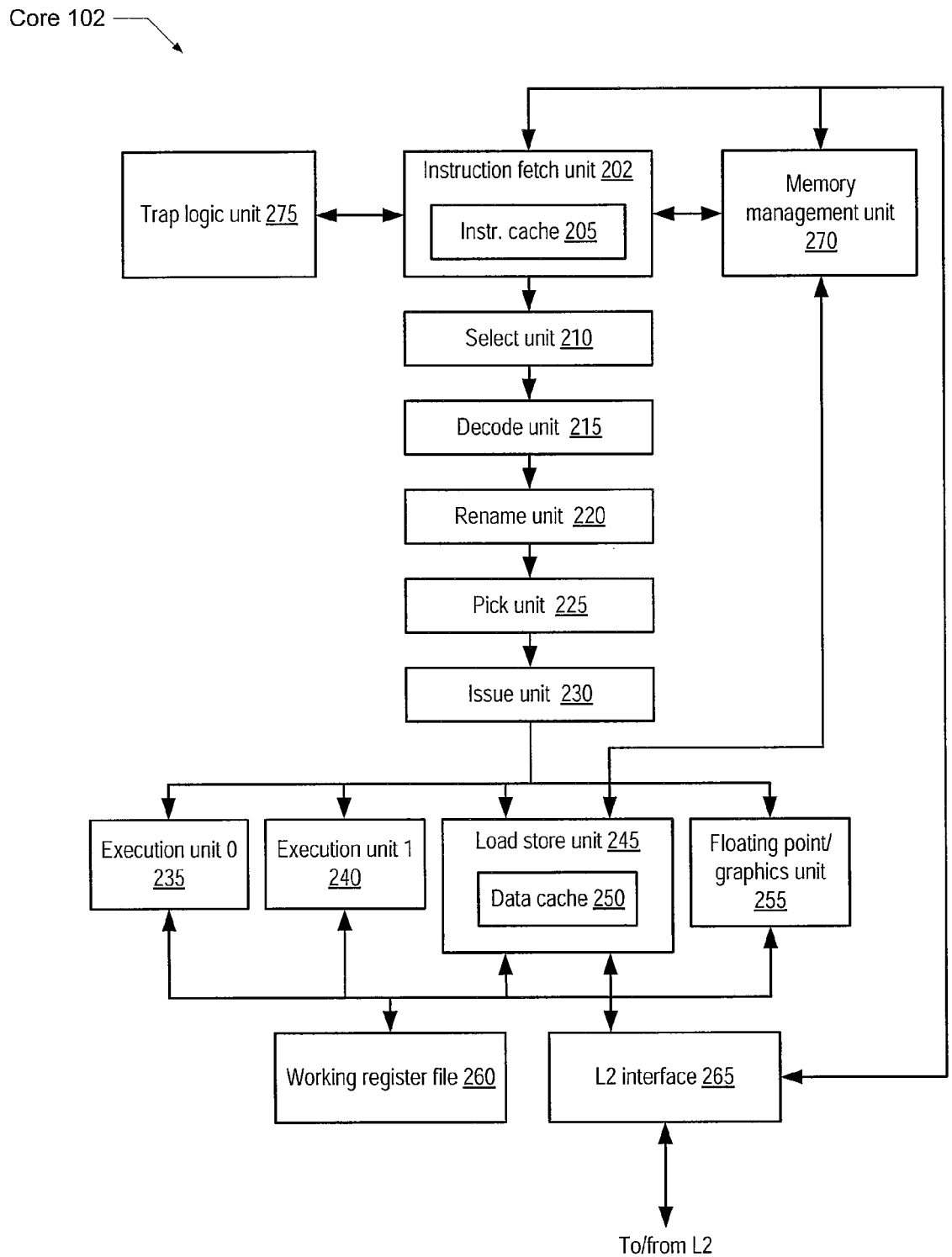
FIG. 2 is a generalized block diagram illustrating one embodiment of a processor core configured to perform dynamic multithreading.

One embodiment of core 102 that is configured to perform dynamic multithreading is illustrated in FIG. 2. In the illustrated embodiment, core 102 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 102 are described. However, it is noted that the illustrated partitioning of resources is merely one example of how core 102 may be implemented. Alternative configurations and variations are possible and contemplated.

Instruction fetch unit (IFU) 202 may be configured to provide instructions to the rest of core 102 for execution. In one embodiment, IFU 202 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 102, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Figure 3:
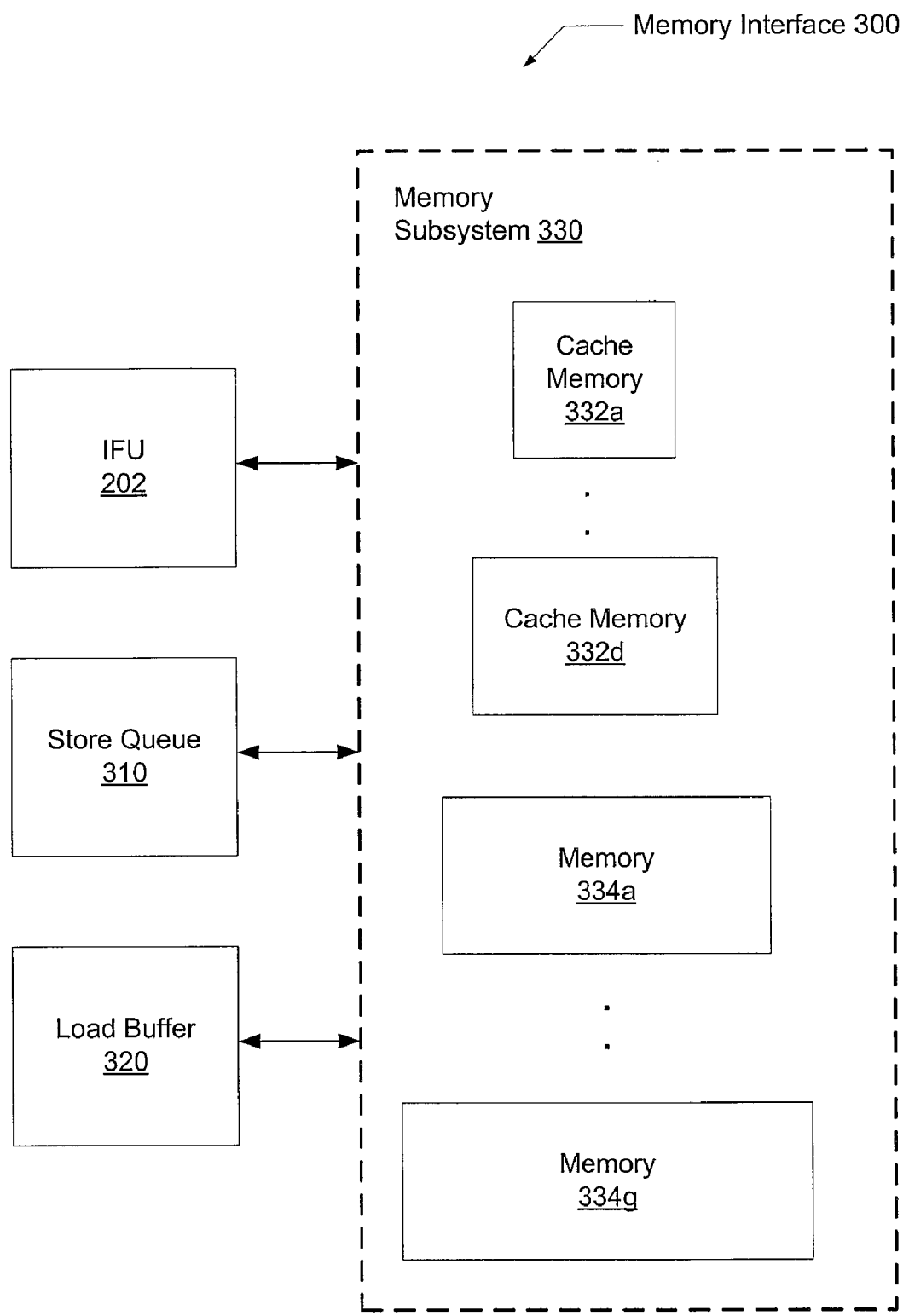
FIG. 3 is a generalized block diagram illustrating one embodiment of a memory interface.

Referring now to FIG. 3, one embodiment of a memory interface 300 illustrating different sources of memory requests is shown. It is noted the components shown in FIG. 3 illustrate a general organization and coupling of components, rather than an actual physical placement of the components. Examples of physical placements may be found in FIG. 1 and FIG. 2. In one embodiment, a memory subsystem 330 comprises one or more levels of caches 332 that may correspond to L1 through L3 caches of a computing system. In addition, the memory subsystem 330 may comprise off-chip memories 334 such as DRAM and a hard disk. Each memory 332 and 334 within memory subsystem 330 may be larger than a previous level of memory in the hierarchy. Each memory 332 and 334 may contain all of the cache lines of a previous level, although the data may be stale relative to the stored contents of a previous level. When a miss occurs for a memory request at a certain level of the memory hierarchy, such as cache memory 332a, then a request may be conveyed to a next level of the hierarchy, such as a cache memory 332b (not shown).

Memory requests may originate at least from the IFU 202, a store queue 310, and a load buffer 320. As described above, IFU 202 may be configured to select a thread to be fetched, to fetch instructions from i-cache 205, which may correspond to cache memory 332a in FIG. 3 unless the L1 cache is not a unified instruction and data cache, for the selected thread, and to request data from L2 cache 105, which may correspond to cache memory 332b (not shown) in FIG. 3, in response to instruction cache misses.

Store queue 310 may be configured to convey memory requests to memory subsystem 300 for a chosen thread in order to write-out data of committed store instructions for the chosen thread. Load buffer 320 may be configured to convey memory requests to memory subsystem 300 for a chosen thread in order to read data of load instructions being executed. Therefore, at least these three sources, IFU 202, store queue 310, and load buffer 320 on the processor core 102 compete for access to memory subsystem 300.

Figure 4:
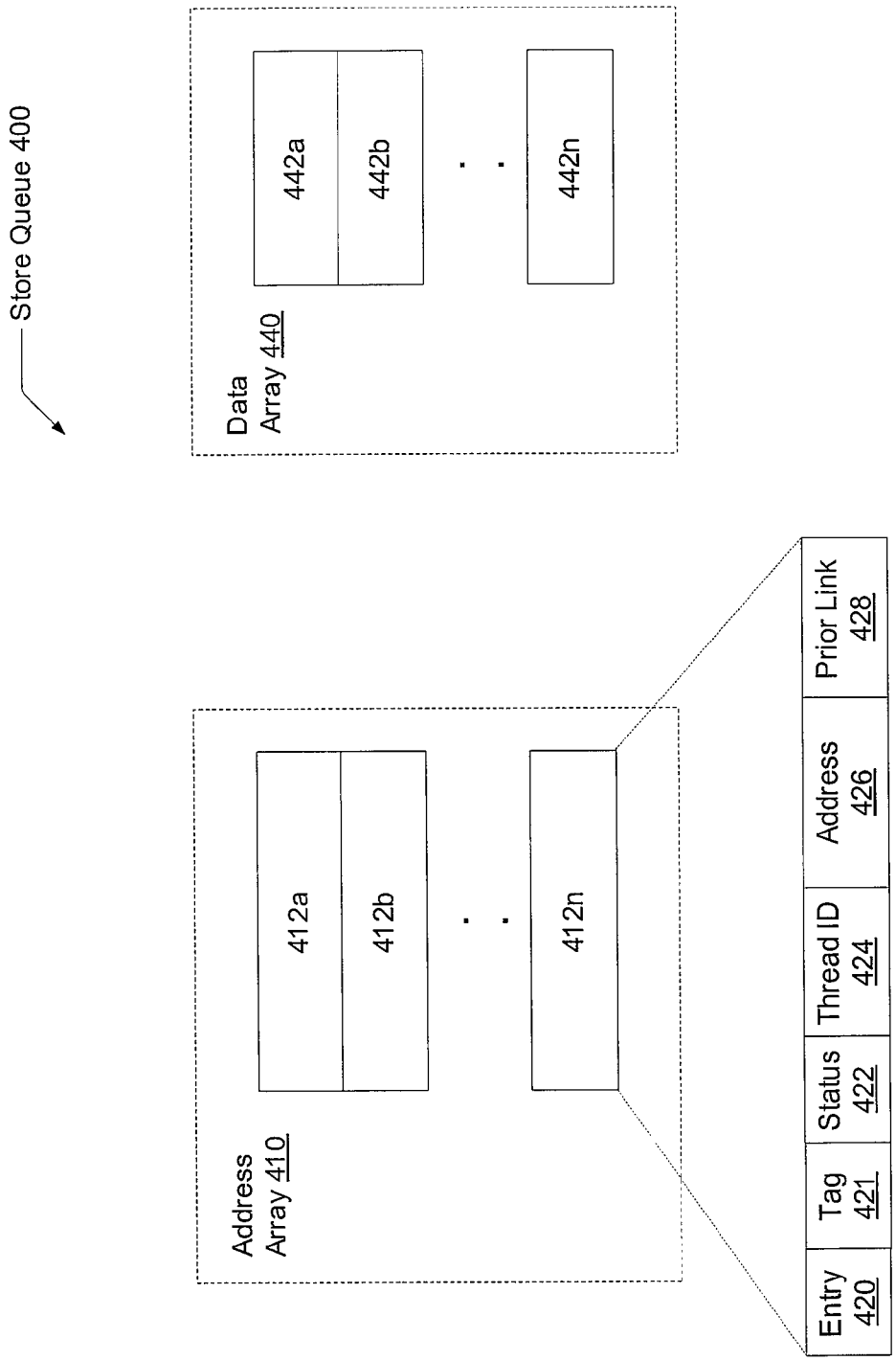
FIG. 4 is a generalized block diagram illustrating one embodiment of the entries of a store queue.

Turning now to FIG. 4, one embodiment of a store queue 400 configured to hold committed store instructions is shown. In one embodiment, a store queue (SQ) 400 holds all committed store instructions or operations of all threads in processor core 102. The buffered store operations may also be micro-operations, or micro-ops, if core 102 is configured to divide instructions into two or more operations. The store queue 400 may have two main components, such as the address array 410 and the data array 440.

The address array 410 may be used for read-after-write (RAW) hazard checking as all load instructions, or operations, may need to check the store queue 400 for RAW hazards prior to being issued. The data array 440 holds the data of committed store instructions until these instructions write-out data to memory subsystem 300 and the corresponding data of the store instruction are now globally visible to all processors and threads within a computing system. A single entry of the store queue 400 may comprise corresponding entries in each of address array 410 and data array 440. For example, a first entry in the store queue 400 may comprise entries 412a and 442a. A second entry in the store queue 400 may comprise entries 412b and 442b, and so forth. For a particular load instruction, when a RAW hazard is detected in the store queue for a particular entry, which has valid data, bypass may occur immediately.

The address array 410 comprises a plurality of entries 412, wherein each entry 412 corresponds to a store instruction, and includes, in one embodiment, an entry number 420, a store queue tag 421, status information 422, a thread identification (TID) number 424, an address 426, and a prior link pointer value 428. Although the fields are shown in this particular order, other combinations are possible and contemplated. Also, additional fields may be utilized. In some embodiments, the bits storing information for the fields 420-428 may be contiguous. In other embodiments, the bits storing information for the fields 420-428 may not be contiguous. Similarly, the arrangement of address array 410 and data array 440 may use other placements for better design trade-offs. The entry number 420 corresponds to the position of an entry in the store queue 400, wherein entry 0 may be configured to be at the top of address array 410 or at the bottom depending on logic preferences. The entry field 420 may be implied rather than an actual stored number. A resource tag, or store queue tag 421, corresponding to a single store instruction in the processor core 102 pipeline may be also held per entry in address array 410.

Status information 422 may comprise one or more valid bits and cache line MESI protocol information associated with corresponding data stored in the data array 440. A thread identifier (TID) 424 may be used to identify a corresponding thread for a particular store operation when store queue 400 is located within a processor core 102 configured to concurrently execute multiple threads.

In one embodiment, the address field 426 may hold a physical address and a byte mask. Entries may be written in a pipeline stage after address translation completes. Load instructions may initiate a content-addressable-memory (CAM) comparison operation, typically implemented via dynamic circuit logic, in order to check for an address overlap. In one embodiment, an address overlap occurs when the address 426 matches, the thread ID 424 matches, and any bit in the load mask has a match in the store mask. For entries with address overlap, the CAM will also check for full or partial matches. A full match occurs when each bit in the load mask has a corresponding bit in the store mask. Otherwise, the match is partial.

The prior link field 428 may utilize a linked list method to maintain ordering of store instructions within a thread by being configured to hold a pointer value to the last store queue entry allocated for the corresponding thread. The pointer value stored in prior link 428 may be used when a next store instruction corresponding to the same thread is allocated in the store queue 400. The pointer value buffered in the prior link field 428 points from the current store instruction corresponding to the current entry to an immediate prior store that was previously allocated. In one embodiment, the prior link field 428 includes a valid bit contiguous with a prior link value in order to indicate a valid value for the prior link field 428. Also, such a bit with an invalid value may indicate the corresponding entry is the beginning of a chain, or list, of linked store instructions for a particular thread. In another embodiment, such a valid bit may be stored in the status information field 422.

Table 1 below depicts one example of address array entries 412 of a store queue 400. For simplicity, one embodiment of a 6-entry address array 410 is shown. In the example, the following store instructions S0, S1, and S2 are in program order, wherein "S" denotes a store queue tag value for a corresponding store instruction. The resource tags, or store queue tags, may be assigned in an instruction retirement pipeline stage. In one embodiment, one tag may be sent each cycle. In another embodiment, multiple tags may be assigned and sent each clock cycle. Table 1 below illustrates one embodiment of representing the state of the address array 410 after store instructions, such as S0-S2 of thread 2 in the example, have been committed.

TABLE 1

Store Queue Address Array Entries

| Entry | Instr | Status | TID | Address | Prior Link |
|---|---|---|---|---|---|
| 6 | S2 |  | 2 |  | 4 |
| 5 |  |  |  |  |  |
| 4 | S1 |  | 2 |  | 1 |
| 3 |  |  |  |  |  |
| 2 |  |  |  |  |  |
| 1 | S0 |  | 2 |  | Begin |
| 0 |  |  |  |  |  |

The address array entries 412 may be dynamically allocated by tag generation logic, wherein any method including a random method of tag generation may be used by one skilled in the art as many known methods are already in use. The execution of the multiple threads within processor core 102 may occur at different rates, and over time the tag allocation may actually appear random. Each entry of the address array 410, depicted in FIG. 4 and described above, also has an example shown in Table 1. Table 1 comprises an entry field, which may be implied rather than actually stored, a store queue tag field, status information, a thread ID (TID), an address, and a prior link pointer value. These fields may correspond to fields 420-428 in the above description regarding FIG. 4. Several fields are left blank for the simplified example in order not to take focus away from the functionality of the prior link field updates and use. A further description of the shown example in Table 1 is provided shortly.

As stated earlier, a processor core 102 comprising a store queue 400 may be configured to perform dynamic multi-threading. It may not be desirable to instantiate on-chip a separate store queue 400 for each thread due to on-chip real estate constraints. Also, a single store queue 400 divided evenly among the maximum number of supported threads, wherein the subdivisions incorporate static allocation, may be inefficient. For example, if processor core 102 is configured to concurrently execute 8 threads and store queue 400 has 64 total entries (or 64 entries 412 and 64 entries 442), then, in one embodiment, 8 store queue entries support each thread. However, the 8 entries in this example for thread 0 may not be fully utilized or may not be utilized at all, as thread 0 may not be scheduled with work. Thread 1, on the other hand, may be utilizing all 8 of its store buffer entries and may need more in order to not experience stalls. Therefore, it may be more efficient and provide higher performance to use dynamic allocation of the store queue entries versus static allocation.

In addition, for the given example, a less number of entries may be used in order to reduce consumption of on-chip real estate, but still provide sufficient performance, such as 64 entries. A reorder buffer (ROB) may have 128 entries, but typically, software applications do not have one quarter of the instructions be memory reference operations such as load and store instructions. However, a cache miss may occur during a write-out of data to memory for a particular thread. Therefore, having a store queue less than the size of a ROB, but also greater than the size of one quarter of the ROB size due to cache misses may be more than sufficient. Simulations may be used to fine-tune the size of the single multi-threaded store queue. A design caveat with dynamic allocation of store queue entries is the entries do not provide an indication of an ordering among the store instructions of a same corresponding thread.

Figure 5:
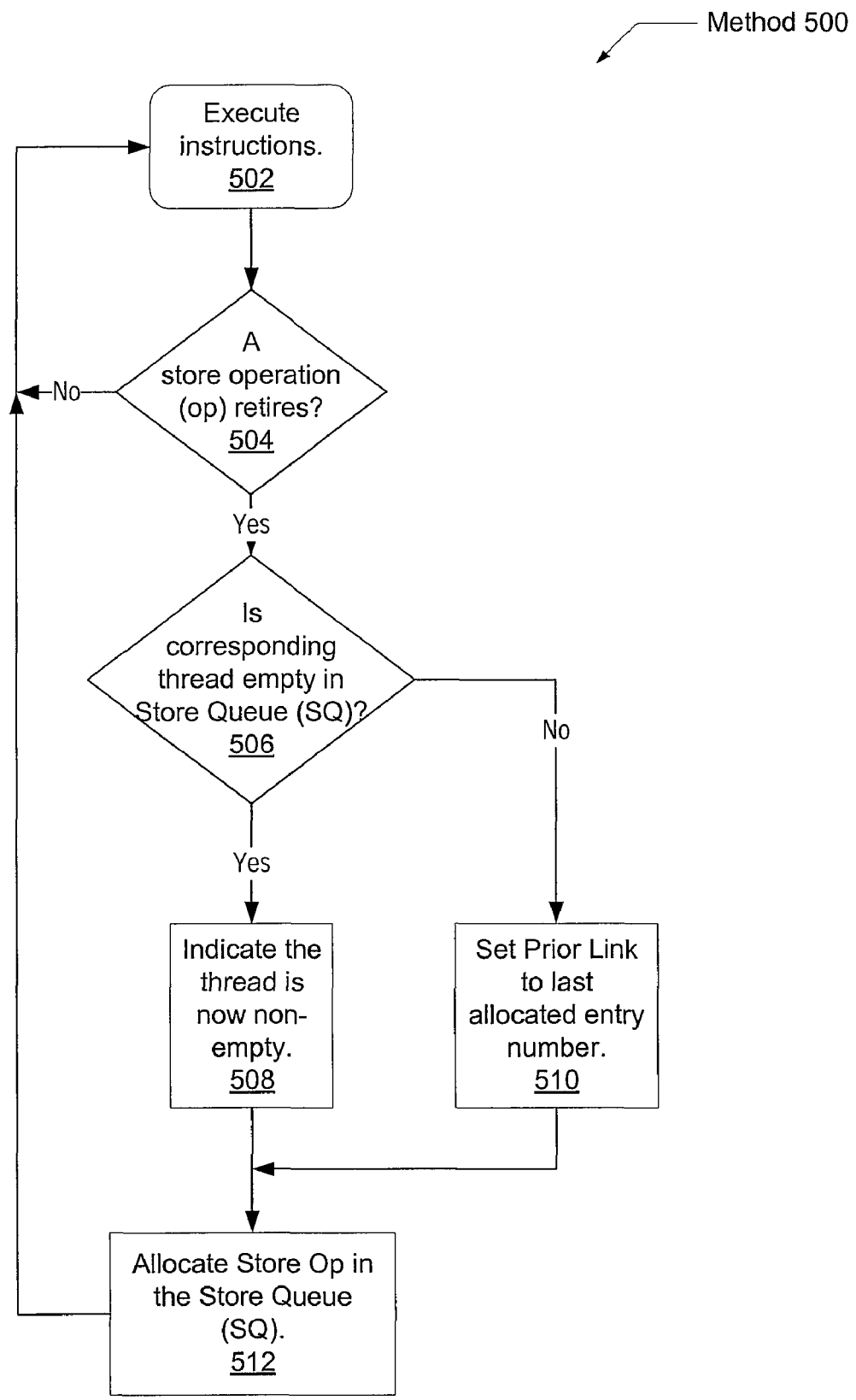
FIG. 5 is a generalized flow diagram illustrating one embodiment of a method for dynamic allocation of the entries of a store queue.

The prior link field 428 may be used to manage the relative ordering of all store instructions, or operations, within each thread in the store queue 400. For in-order write-out of data of committed store instructions within a particular thread, a mechanism may be needed that utilizes pointer values stored in prior link field 428. Referring now to FIG. 5, one embodiment of a method 500 for dynamic allocation of the entries of a store queue is illustrated. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

A processor core 102 may be executing instructions of one or more software applications in block 502. In one embodiment, core 102 may be configured to perform dynamic multithreading. If a store instruction, or operation, obtains its corresponding data and is ready for instruction commit (conditional block 504), or retirement, then in conditional block 506, a check is performed to verify whether the corresponding thread is empty in a store queue 400.

In one embodiment, detecting a particular thread is empty (conditional block 506), or the thread has no corresponding entries, in the store queue 400 may include reading a register corresponding to the particular thread, such as a head pointer register. This head pointer register may hold an identifier value of a store queue entry holding the first store instruction of a chain of committed store instructions of the particular thread. For example, for thread 2 in the above example regarding Table 1, entry 1 corresponding to store queue tag "S0" will hold the first store instruction of a future chain of committed store instructions ("S0", "S1", "S2"). However, prior to allocating entry 1, thread 2 is empty within store queue 400. If this head pointer register has an invalid, out-of-bounds, or other predetermined value to indicate the corresponding thread is empty, then control flow of method 500 moves from conditional block 506 to block 508. In an alternative embodiment, for each thread, a single bit Empty register may accompany the head pointer register and this single bit value may be used to indicate whether a corresponding thread is empty. In one example, a set, or logic high value, stored in this Empty register may indicate an empty thread, and a reset, or logic low value, may indicate a non-empty thread.

If it is detected the corresponding thread, such as thread 2 in the example shown in Table 1, of the corresponding store instruction, such as the store instruction with the store queue tag "S0" in the example, currently does not have any prior allocated entries in the store queue 400 (conditional block 506), or the thread is empty in the store queue 400, then in block 508, action is taken to indicate the corresponding thread, such as thread 2 in Table 1, is no longer empty. For example, a corresponding Empty Register may be reset. Alternatively, a corresponding head pointer register may be written with a value '1' to correspond to a valid store queue entry number 1. If it is detected the corresponding thread is non-empty (conditional block 506), such as entry 4 is to be allocated and entry 1 remains allocated at this time, then in block 510 the chain of committed store instructions is updated with the current committed store instruction. A further description of this process is given below.

In block 508, a pointer value indicating the beginning of a chain of store instructions is chosen to be stored in the prior link field 428. This value is designated as "Begin" in the example shown in Table 1. In another embodiment, a corresponding link valid bit, which may be stored within the status field 422 or the prior link field 428, may be set to a value, such as a logic low value, to indicate a "Begin" value for the corresponding entry. Alternatively, no new value may be stored in the prior link field 428 as it is not to be used. Rather, outside register values may be updated as described below.

In one embodiment, in block 508, the entry number "1" may be stored in a register (e.g., a tail pointer register) corresponding to the current thread in order to hold the store queue entry number of the last committed store instruction allocated in the store queue for the corresponding thread. For example, for thread 2, the entry number "1" will hold the last committed store instruction allocated in the store queue. Therefore, the value "1" may be written into the corresponding tail pointer register.

In one embodiment, in block 510, the prior link field 428 of the current entry being allocated (dynamically, in one embodiment) is updated with the contents stored in the corresponding tail pointer register. The tail pointer register may hold the entry number of the last committed store instruction allocated in the store queue for the corresponding thread. For example, in Table 1, when the committed store instruction "S1" is allocated in entry 4 of the store queue 400, the prior link field 428 may be updated with the value "1" stored in a previous clock cycle in the tail pointer register. The value "1" stored in this register may indicate that entry 1 of the store queue 400 holds the last committed store instruction, "S0", prior to the current store instruction "S1". At the end of a clock cycle, this tail pointer register may be updated with the value "4" for use by a subsequent committed store instruction, such as "S2".

Regardless of whether the corresponding thread was empty or non-empty, in block 512, the chosen entry to be allocated is updated with associated information of the committed store instruction. For example, entry 1 in Table 1 is written with associated information for committed store instruction "S0", and in a later clock cycle, entry 4 is written with associated information for committed store instruction "S1". A particular store instruction may be dynamically allocated an entry in the store queue 400. For example, in Table 1, a store instruction designated by a store queue tag "S0" is allocated entry 1. Many methods for choosing a particular available entry in the store queue 400 are known by those skilled in the art, and each method is possible and contemplated. Then control flow of method 500 moves from block 512 to block 502.

Figure 6:
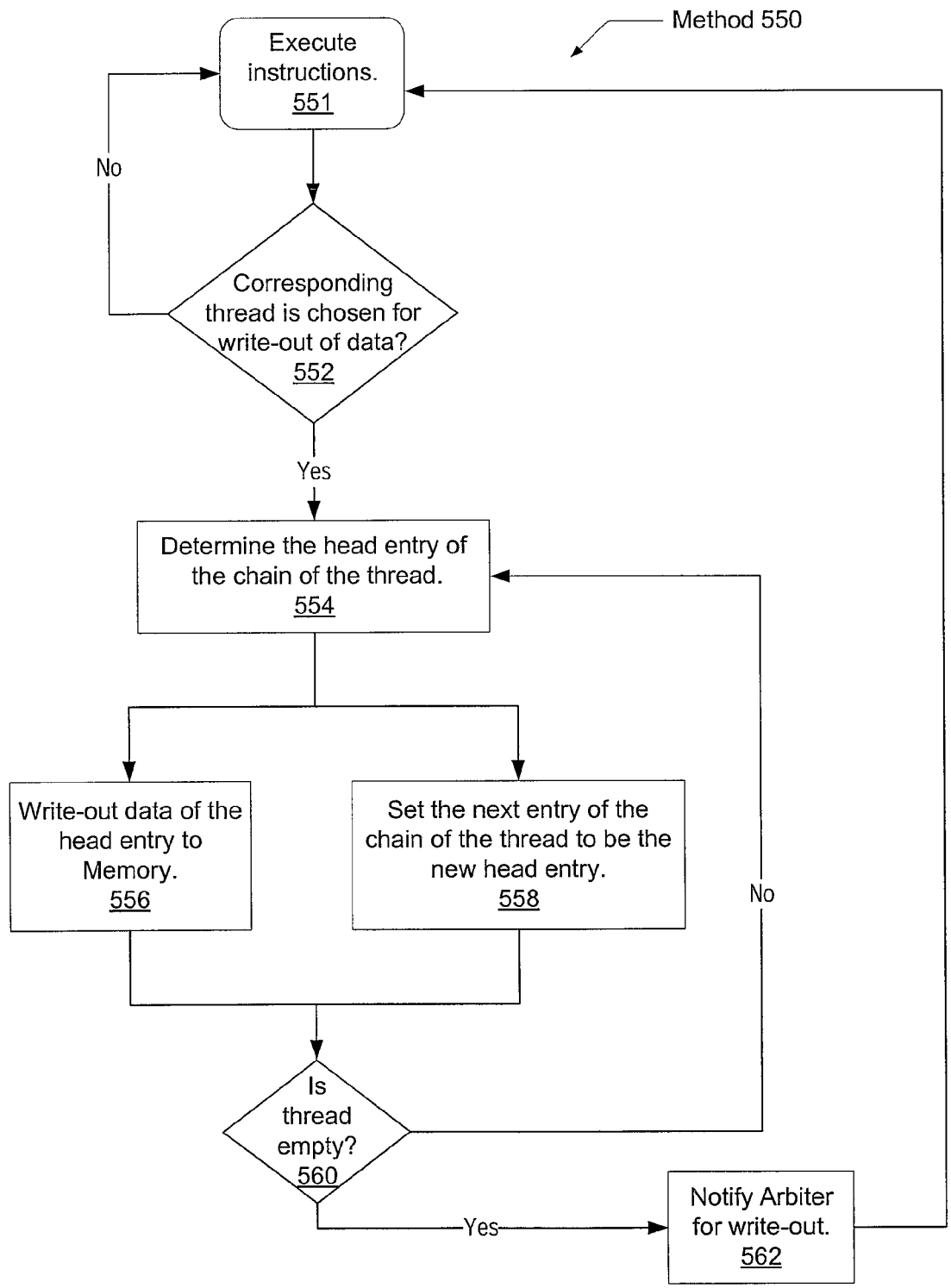
FIG. 6 is a generalized flow diagram illustrating one embodiment of a method for data write-out of the entries of a store queue.

Turning now to FIG. 6, one embodiment of a method 550 that continues method 500 for storage of pending writes to memory corresponding to multiple threads is illustrated. The components embodied in the computer system described above may generally operate in accordance with method 550. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, a processor core 102 may be executing instructions of one or more software applications in block 551. If a thread is chosen (e.g., by an arbiter) to have committed store instruction data be sent (in-order) to a memory subsystem 300 (conditional block 552), then in block 554, the head entry of the in-order chain of store instructions of the chosen thread is determined. For example, regarding Table 1, an arbiter may choose thread 2 to write-out in-order data to memory. An arbiter may determine a ready thread to write-out data based upon a programming of priority levels, a simple sequential routine, or other desired algorithm. Next, a head pointer register corresponding to thread 2 may be read to determine entry 1 is the head entry that holds associated information of the first store instruction ("S0") of the in-order chain of store instructions ("S0", "S1", "S2").

Data corresponding to the head entry, such as a corresponding entry 442 in the data array 440, may then be read out from the store queue in block 556 and sent to a memory subsystem. Also, associated information may accompany the data such as status information 422 and TID 424. Address 426 may be sent in order to locate a corresponding cache line to be modified in the memory subsystem. The data may be sent to an L1 data cache 250. If a cache miss occurs, then later the data may be sent to a L2 data cache. The data and associated information may be stored in a miss buffer during a cache miss. Upon successful conveying of the data, or store data, and associated information, the corresponding entries 412 and 442 may be marked as invalid or unfilled in order to provide an available entry for subsequent allocation for the same thread or other threads. Although both the write-out of data and associated status information regarding method 550 and the allocation of store queue entries regarding method 500 are both described as occurring for one entry at one time, it is contemplated that the action and determinations performed may occur for two or more entries at a time. The actual number of entries may be determined by available on-chip real estate for parallel buses, circuit characteristics such as the number of CAM ports to use per cell of a store queue based upon capacitive loading and signal timing, and microarchitecture reasons In one embodiment, the steps performed in blocks 556 and 558 may occur simultaneously. For example, in parallel with the write-out of the corresponding data and status information in block 556, the entry holding associated information of the next store instruction in the chain of store instructions may be determined in block 558. Alternatively, the actions within block 558 may occur sequentially after the actions within block 556. Such an alternative embodiment may yield the same results, although timing requirements could differ. For example, if blocks 556 and 558 are performed sequentially, an extra clock cycle or phase may be needed. In one embodiment, the current entry number, such as entry 1, is used in a CAM comparison operation with the prior link field 428 of all entries of the store queue 400. Such a comparison may utilize dynamic logic. An entry that hits during this comparison, such as entry 4, is determined to correspond to the next store instruction in the chain. In one embodiment, the head pointer register is updated with the entry number of the next store instruction in the chain, such as the value "4". In this example, entry 4 is now the beginning of the chain, or the new head entry, and entry 1 is deallocated both from the store queue and from the chain. The prior link valid bit corresponding to entry 4 may be reset to indicate "Begin" in the prior link field 428. It is noted that the chain of committed store instructions for thread 2 in this example may simultaneously be growing (with corresponding updates of the tail pointer register) as deallocation occurs (with corresponding updates of the head pointer register).

If the thread is still non-empty after the last write-out of data (conditional block 560), then control flow of method 550 returns to block 554 where the updated head pointer register may be read in order to determine the new head entry of the chain of the corresponding thread. For example, after data and associated status information of entry 1 is written-out to memory, thread 2 is still non-empty, and entry 4 is found to be the next entry to write-out. Later, data and associated status information of entry 4 is written-out to memory, thread 2 is still non-empty, and entry 6 is found to be the next entry to write-out based on the CAM match hit of the prior link field 428. It is noted that the arbiter may decide to grant priority at any time to another thread. Therefore, once an entry completes deallocation from the store queue and the head pointer register is updated, control may leave method 550 until the arbiter reassigns priority to the corresponding thread, such as thread 2 in this example. In this case, method 550 begins at block 552 again.

If no other store instruction has been allocated to the store queue for thread 2 subsequent "S2", then entry 6 is the last allocated entry for thread 2. After data and associated status information of entry 6 is written-out to memory and no other entry for the corresponding thread is being allocated by method 500, thread 2 becomes empty upon the write-out of the data and associated status information. In one embodiment, the CAM comparison operation generates zero hits, which signifies the current entry, entry 6, is the last entry for thread 2. In another embodiment, if the values of the head pointer register and the tail pointer register for the same corresponding thread hold the same value, such as "6" in this example, and neither register is going to be updated by the end of the clock cycle, the thread is empty. In yet another embodiment, a counter may be used on a per thread basis to monitor the number of store queue entries in a respective chain of committed store instructions. A zero value may indicate the corresponding thread is empty. Other methods for determining an empty thread are possible and contemplated. Also, the CAM comparison operation may be disabled for this particular clock cycle in order to reduce power consumption.

If the chosen thread for data write-out to memory is determined to be empty (conditional block 560), then in block 562, an arbiter may be notified in order to choose a new ready thread for data write-out. Also, a value that indicates an empty thread may be stored in a head pointer register of the current thread. Alternatively, a corresponding Empty Register may be set. Control flow of method 550 then returns to block 551.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A store queue comprising:
an array comprising a plurality of entries, wherein each entry is configured to store data for a committed store instruction, and wherein the array is configured to:
dynamically allocate an entry of the array out of program order; and
convey store data of each entry of the plurality of entries in program order;
circuitry configured to:
identify a first entry of the entries that corresponds to an oldest committed store instruction for a given thread; and
determine a next entry of the array that corresponds to a next committed store instruction in program order following the oldest committed store instruction of the given thread, wherein said next entry includes data identifying the first entry.

2. The store queue as recited in claim 1, wherein said data identifying the first entry comprises a link value, and wherein to determine said next entry, the circuitry is configured to compare an identifier of the first entry with a link value stored in one or more of the plurality of entries.

3. The store queue as recited in claim 2, wherein the identifier of the first entry is an array entry number.

4. The store queue as recited in claim 2, wherein in response to allocation of a given entry of the array for a first store instruction that follows in program order a second store instruction of the given thread previously allocated in a prior entry, the circuitry is configured to store an identification of the prior entry in the given entry.

5. The store queue as recited in claim 4, wherein in response to allocation of the given entry, the circuitry is further configured to update a first pointer value that identifies the prior entry with an identification of the given entry.

6. The store queue as recited in claim 2, wherein in response to determining no entry of the plurality of entries comprises a value that identifies the first entry, the circuitry is configured to update a second pointer value that identifies the first entry with a second value that indicates the given thread does not have any other allocated entries in the array.

7. The store queue as recited in claim 5, wherein the first pointer value corresponds to the given thread.

8. The store queue as recited in claim 6, wherein the array is further configured to store, for a committed store instruction, at least one or more of the following: a thread identifier (TID), a valid bit, and an address.

9. A method comprising:
storing data for a committed store instruction in an array comprising a plurality of entries;
dynamically allocating an entry of the array out of program order; and
conveying store data of each entry of the plurality of entries in program order;
identifying a first entry of the plurality of entries that corresponds to an oldest committed store instruction for a given thread; and
determining a next entry of the array that corresponds to a next committed store instruction in program order following the oldest committed store instruction of the given thread, wherein said next entry includes data identifying the first entry.

10. The method as recited in claim 9, wherein said data identifying the first entry comprises a link value, and wherein determining said next entry comprises comparing an identifier of the first entry with a link value stored in each entry of the plurality of entries.

11. The method as recited in claim 10, wherein the identifier of the first entry is an array entry number.

12. The method as recited in claim 10, wherein in response to allocation of a given entry of the array for a first store instruction that follows in program order a second store instruction of the given thread previously allocated in a prior entry, the method further comprises storing an identification of the prior entry in the given entry.

13. The method as recited in claim 12, wherein in response to allocation of the given entry, the method further comprises updating a first pointer value that identifies the prior entry with an identification of the given entry.

14. The method as recited in claim 10, wherein in response to determining no entry of the plurality of entries comprises a value that identifies the first entry, the method further comprises updating a second pointer value that identifies the first entry with a second value that indicates the given thread does not have any other allocated entries in the array.

15. The method as recited in claim 14, wherein the first pointer value corresponds to the given thread.

16. The method as recited in claim 14, further comprising storing, for a committed store instruction, at least one or more of the following: a thread identifier (TID), a valid bit, and an address.

17. A non-transitory computer readable storage medium storing program instructions operable to efficiently store pending writes to memory corresponding to multiple threads, wherein the program instructions are executable to:
   store data for a committed store instruction in an array comprising a plurality of entries;
   dynamically allocate an entry of the array for a committed store instruction, wherein entries of the array may be allocated out of program order; and
   convey store data of committed store instructions of each entry of the plurality of entries in program order;
   identify a first entry of the plurality of entries that corresponds to an oldest committed store instruction for a given thread; and
   determine a next entry of the array that corresponds to a next committed store instruction in program order following the oldest committed store instruction of the given thread, wherein said next entry includes data identifying the first entry.

18. The storage medium as recited in claim 17, wherein said data identifying the first entry comprises a link value, and wherein determining said next entry comprises comparing an identifier of the first entry with a link value stored in one or more of the plurality of entries.

19. The storage medium as recited in claim 18, wherein in response to allocation of a given entry of the array for a first store instruction that follows in program order a second store instruction of the given thread previously allocated in a prior entry, the program instructions are executable to store an identification of the prior entry in the given entry.

20. The storage medium as recited in claim 19, wherein in response to allocation of the given entry, the program instructions are executable to update a first pointer value that identifies the prior entry with an identification of the given entry.

* * * * *